PUSH-PULL MIXING CIRCUIT ARRANGEMENT

Filed July 20, 1946

ADELBERT VAN WEEL.
INVENTOR.

BY Theo. M. Vogel

AGENT.

Patented Jan. 16, 1951 2,538,715

UNITED STATES PATENT OFFICE 2,538,715

PUSH-PULL MIXING CIRCUIT ARRANGEMENT

Adelbert van Weel, Eindhoven, Netherlands, assignor to Hartford National Bank and Trust Company, Hartford, Conn., as trustee Application July 20, 1946, Serial No. 685,203
In the Netherlands October 18, 1943

Section 1, Public Law 690, August 8, 1946
Patent expires October 18, 1963

6 Claims. (Cl. 250—20)

Figure 1:
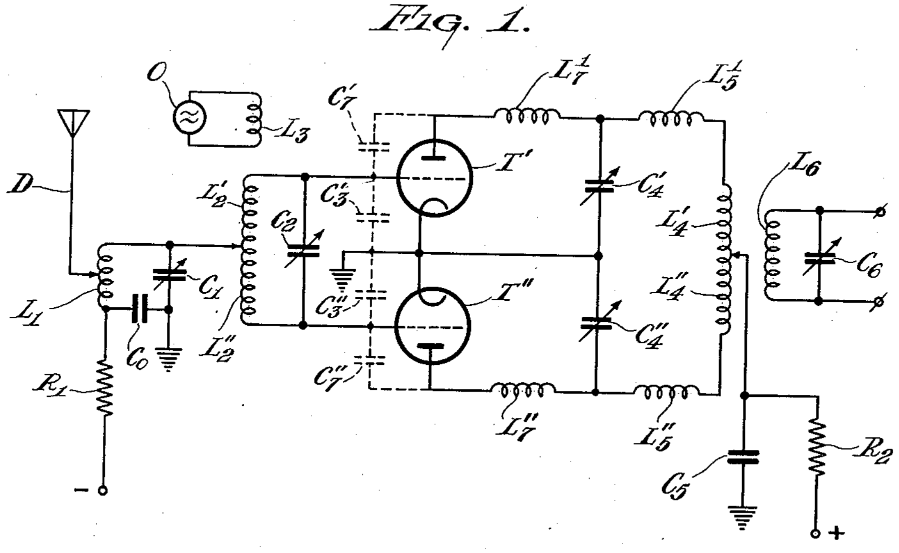

This invention relates to a mixing circuit-arrangement in which the oscillations received are supplied in the same phase and the local oscillations in push-pull to the input electrodes of two discharge systems. In transmitting ultra-high frequencies this method of receiving has the advantage that a better signal-to-noise ratio is obtained.

Mixing circuits of this kind, however, exhibit the disadvantage that the input impedance of the discharge systems, particularly when receiving ultra-short waves, has only a small value, owing to which the voltage having the oscillator frequency and appearing between the input electrodes of each of the systems usually becomes too low.

According to the invention this drawback can be avoided by tuning the resonant circuit, constituted by the series-connection of the impedances between the one pair of corresponding input electrodes of the discharge systems, the impedances between the other pair and the input impedances of the two discharge systems, to the frequency of the local oscillations. In this case, however, it is not necessary to provide impedances between each of the pairs of input electrodes; in many cases one of the pairs will be directly connected.

The input impedance of a discharge system comprises all impedances between the input electrodes of this system.

In some cases, however, the aforesaid measure does not lead completely to the result aimed at, since the said circuit is frequently damped too strongly. This damping is due to the input damping of the mixing tubes and in addition to a negative feed-back, set out hereinafter, which is brought about by the capacitative anode load.

According to a further feature of the invention the operation of circuits of the aforesaid kind in which use is made of discharge systems comprising at least a cathode, an input electrode and an output electrode, can be materially improved by using a positive feed-back for the local oscillations, as a result of which the said circuit is negatively damped.

A particularly suitable embodiment of the invention is obtained by giving the positive feed-back such a strength that the local oscillations are generated in the said circuit. In this case a separate oscillator for the generation of the local oscillations can be dispensed with, which yields an important simplification of the circuit.

The feed-back current or voltage for the positive feed-back is preferably taken from a part of the output circuit, in which appear both the local oscillations and the incoming oscillations, so that apart from the said circuit also the input circuit of the circuit-arrangement is negatively damped in regard to the incoming oscillations. The positive feed-back for the incoming oscillations thus obtained offers the advantage of achieving an improvement of the signal-to-noise ratio.

The damping of the said circuit is in general different from the damping of the input circuit for the incoming oscillations because the last-mentioned circuit is damped to a much higher degree than the former circuit by the aerial. Therefore it is advisable to make the feed-back different for the two kinds of oscillations, which may be achieved by taking a feed-back current or voltage, in addition to the feed-back current or voltage already mentioned, from a part of the output circuit in which appear either solely the local oscillations or solely the incoming oscillations.

A suitable embodiment of the invention consists in that the positive feed-back is obtained by making the impedance of the output circuit predominantly inductive for the local oscillations, and as the case may be, also for the incoming oscillations. To this end, for example, inductances may be inserted in parts of the output circuits in which appear the local oscillations and the incoming oscillations the desired difference in strength of the feed-back in regard to both kinds of oscillations being obtained by inserting one or more capacities in a part of the output circuit in which appear solely the local oscillations or solely the incoming oscillations.

In order that the invention may be clearly understood and readily carried into effect, it will now be explained more fully with reference to the accompanying drawing, in which two embodiments thereof are represented by way of example.

Figure 2:
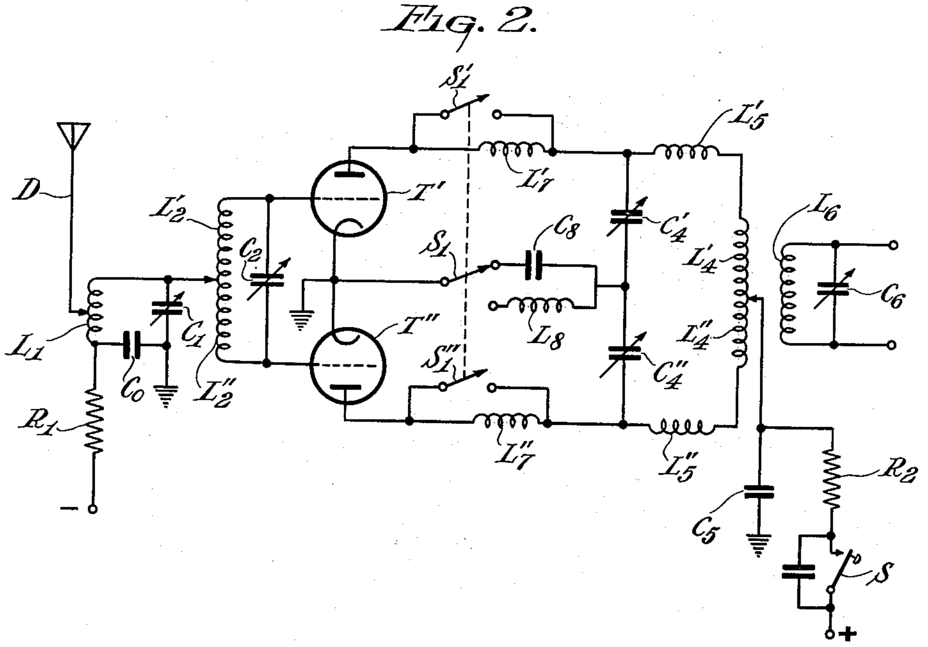

In the drawing:

Fig. 1 is a schematic circuit of a mixer stage in accordance with the invention, and Fig. 2 is a schematic circuit of a transceiver in accordance with the invention.

Figure 1 shows a mixing circuit-arrangement forming part of a superheterodyne receiver for oscillations having a very high frequency. These oscillations are picked up by an aerial D and transmitted to an input resonant circuit which consists of an inductance $L_1$, a tuning condenser $C_1$ and a blocking condenser $C_0$. The aerial is connected to a tapping of the coil $L_1$; the top of the input resonant circuit is connected to the junction of two coils $L_2'$, $L_2''$, whose two other ends are each directly connected to one of the control grids of two mixing triodes T' and T''.

The input capacities of the triodes T', T'' are denoted by $C_3'$ and $C_3''$ respectively. The coils $L_2'$, $L_2''$ are inductively coupled with a coil $L_3$ included in the output circuit of a local oscillator O represented diagrammatically. The cathodes of the triodes T', T'' are jointly connected to earth. From what has been said above it appears that the local oscillations are supplied in push-pull and the incoming oscillations in the same phase to the control grids of the triodes. As far as the oscillations of the same phase are concerned, there are two circuits connected in parallel with the input resonant circuit viz one circuit consisting of the series connection of the coil $L_2'$ and the capacity $C_3'$ and one circuit consisting of the series connection of the coil $L_2''$ and the capacity $C_3''$. The complete input circuit constituted by $L_1$, $C_1$, $L_2'$—$C_3'$ and $L_2''$—$C_3''$ is tuned to the frequency of the incoming oscillations.

A resonant circuit tuned to the intermediate frequency and consisting of two inductances $L_4'$ and $L_4''$ and of two condensers $C_4'$ and $C_4''$ is connected in push-pull to the anodes of the two triodes. In series with coils $L_4'$ and $L_4''$ are connected high-frequency chokes $L_5'$ and $L_5''$ which serve to prevent a transmission of the high-frequency oscillations to receiver parts next to the mixing stage. The junction of the coils $L_4'$, $L_4''$ is connected to earth through a condenser $C_5$, which forms practically a short-circuit for the intermediate frequency oscillations, and to the positive terminal of a source of anode potential (not shown) through a resistance $R_2$. The coils $L_4'$, $L_4''$ are furthermore inductively coupled with a second intermediate frequency circuit $L_6$, $C_6$ from which the output voltage of the circuit is taken. The junction of the condensers $C_4'$ and $C_4''$ is connected to the cathodes of the two triodes, in order to obtain a circuit having a low impedance in regard to anode currents having the frequency of the incoming oscillations. As the circuit-arrangement described is particularly suitable for frequency conversion of ultra-short waves, the input resonant circuit $L_1$, $C_1$ will frequently have the form of a Lecher system in practice. The two triodes T', T'' may advantageously be housed in one tube and, as the case may be, have a cathode in common.

The circuit described so far exhibits the disadvantage that the input impedance of the triodes, represented in the drawing by the capacity $C_3'$ and $C_3''$ respectively has only a small value, particularly in receiving ultra-short waves, due to which the voltage between the control-grid and the cathode of each of the tubes, having the frequency of the oscillator, mostly becomes too low.

In order to supply as high as possible a voltage having the oscillator frequency to the control grids of the mixing triodes, the circuit constituted by the series connection of the impedances ($L_2'$—$L_2''$, $C_2$) between the control grids of the mixing triodes, and the input impedances ($C_3'$, $C_3''$) of the two discharge systems is tuned to the frequency of the local oscillations. In the present case the other pair of corresponding input electrodes (the two cathodes) is interconnected, so that there are no impedances between the two cathodes.

To permit the said circuit to be tuned a variable condenser $C_2$ is inserted in the circuit parallel with the coils $L_2'$, $L_2''$. The voltage across the capacities $C_3'$ and $C_3''$ having the oscillator frequency is a maximum if resonance occurs in the circuit constituted by $L_2'$—$L_2''$, $C_2$, $C_3'$ and $C_3''$.

However, the measure described does not always lead to the desired result the circuit being usually damped too strongly. This damping is due to the input damping of the mixing tubes and, in addition to the negative feed-back coupling brought about by the capacitative anode load. In effect the capacity of the condensers $C_4'$ and $C_4''$ may not be chosen too high, because in this case the impedance of the intermediate frequency circuit $L_4'$, $L_4''$, $C_4'$, $C_4''$ would become too low. Consequently, the condensers $C_4'$, $C_4''$ form an impedance which may not be neglected in regard to the oscillator frequency, so that between anode and cathode of each triode an anode voltage having the oscillator frequency is set up which leads in phase by 90° with respect to the alternating control-grid voltage. The said anode-voltage brings about a current through the anode-control grid capacity $C_7'$, $C_7''$ which is in phase-opposition relatively to the alternating control-grid voltage and which consequently has a damping effect on the said circuit.

According to another feature of the invention the said drawbacks can be avoided and the operation of the circuit still be improved materially by making use of a positive feed-back coupling for the local oscillations, as a result of which the said circuit is negatively damped. In the circuit described this positive feed-back coupling is brought about by the insertion of two inductances $L_7'$ and $L_7''$ in the anode circuits of the two triodes T' and T''. In fact, owing to the voltage loss through the coils $L_7'$ and $L_7''$ an alternating anode voltage having the oscillator frequency appears between anode and cathode of each of the triodes, this voltage lagging in phase by 90° relatively to the alternating control-grid voltage. Consequently through the anode-control grid capacities $C_7'$, $C_7''$ flow currents having the oscillator frequency which are in phase with the alternating control-grid voltage and consequently bring about undamping of the said circuit. This negative damping is preferably raised to such an extent that the circuit produces oscillations having the oscillator frequency; in this case the separate oscillator O may be dispensed with.

The capacities $C_4'$ and $C_4''$ also bring about a damping of the input resonant circuit tuned to the frequency of the incoming oscillations; this damping may be accounted for similarly to the damping of the push-pull connected resonant circuit tuned to the oscillator frequency. However, the input resonant circuit similarly to the push-pull circuit, is negatively damped by providing the coils $L_7'$ and $L_7''$. The positive feed-back coupling taking place in this case in regard to the incoming oscillations has the advantage of obtaining an improvement of the signal-to-noise ratio. As has already been said before, the damping of the input resonant circuit differs in general from the damping of the push-pull circuit $L_2'$, $L_2''$, $C_2'$, $C_3'$, $C_3''$, so that it is advisable to make the feed-back different for the two circuits which, in the circuit shown in Figure 1 is ensured by including an impedance (not shown) in the lead between the cathodes of the triodes and the junction of the capacities $C_4'$ and $C_4''$. Through this impedance passes solely a current having the frequency of the incoming oscillations, so that by the presence of this impedance solely the feed-back of the incoming oscillations is acted upon. If this impedance constitutes a capacity in regard to the incoming oscillations the positive feed-back for these oscillations decreases; if, however, this impedance is an inductance, the positive feed-back for the incoming oscillations is increased.

By a symmetrical arrangement of the connecting point of the top of the circuit $L_1$, $C_1$ to the coils $L_2'$, $L_2''$ with respect to the two triodes T', T'', it can be avoided that the aerial D emits the local oscillations. This is avoided completely or practically completely under all conditions—even if the top of the circuit $L_1$, $C_1$ be not connected symmetrically—when the aerial is connected to a voltage minimum for the local oscillations. This may, for example, be achieved by inserting a capacity in series with lower part of the coil $L_1$ in such a manner that the series connection of this part of $L_1$ and this capacity is tuned on the frequency of the local oscillations. In this way, however, the correct matching of the aerial to the input resonant circuit is, in general, completely or partly cancelled.

Therefore it is advisable to utilize this measure without jeopardising the said matching. This may, for example, be effected by providing between aerial and earth a network that has no or only a low impedance in regard to the frequency of the local oscillations, preferably a series connection of an inductance and a capacity which is tuned to the frequency of the local oscillations: by subsequently shifting the connecting point of the aerial to the coil L, the aerial can be correctly matched again to the circuit. This matching is also possible by varying the inductance of the part of the coil $L_1$ between aerial and earth.

If the aerial is not coupled directly, but inductively or capacitatively with the input resonant circuit, one may proceed in the same manner.

When taking the aforesaid steps it should be considered that the input circuit must remain tuned to the frequency of the incoming oscillations in the manner set out above. Consequently, if by providing the said series connection between aerial and earth the tuning of the circuit has changed, the correct tuning can be reestablished by varying one or more of the reactances of the circuit.

The positive feed-back described may effectually be used in transceiver circuit-arrangements, whose receiving part comprises a mixing circuit according to the invention.

Transceiver circuit-arrangements are known, in which a tube acting as a local oscillator during reception, is used at the same time for producing the oscillations to be transmitted. However, if during reception use is made of two discharge systems arranged in push-pull in the manner described above, the use of this method entails difficulties, because the local oscillations generated in push-pull must first be converted into oscillations having the same phase relatively to earth in order that they may be transmitted by the receiving aerial.

According to a further feature of the invention these difficulties are avoided by providing means that permit the said discharge systems or a preceding high-frequency amplification system to be coupled back in such a manner that these systems generate oscillations which can be transmitted by means of the receiving aerial used.

Thus it is achieved that the transmitted oscillations have the frequency to which the receiving aerial is tuned, whilst moreover, the aerial is matched as favourably as possible to the input resonant circuit just in regard to this frequency.

The said circuit-arrangement may comprise one or more switches which permit such feed-back impedances and/or damping resistances to be switched on at will that either the oscillations to be transmitted or the local oscillations to be used for reception are generated.

This will be more fully explained with reference to Figure 2 which represents a transceiver circuit of this kind. The circuit-arrangement substantially corresponds with that of Fig. 1; however, the coils $L_7'$, $L_7''$ can be short-circuited with the aid of switches $S_1'$, $S_1''$. By means of switch $S_1$ a condenser $C_8$ or an inductance $L_8$ can be inserted at will in the lead between the cathodes of the triodes and the junction of the capacities $C_4'$, $C_4''$. The switches $S_1$, $S_1'$, $S_1''$, are interconnected in such a manner that in the transmitting position the inductances $L_7'$, $L_7''$ are short-circuited and that the coil $L_8$ is switched on. In the receiving position, on the contrary, the condenser $C_8$ and the coils $L_7'$, $L_7''$ are put into circuit.

In the last-mentioned position the local oscillations are generated by the circuit-arrangement itself as a result of the positive feed-back brought about by coils $L_7'$, $L_7''$. By switching on the condenser $C_8$ the positive feed-back for the incoming oscillations is simultaneously reduced to such a degree that the production of these oscillations by the circuit itself is prevented, and notwithstanding that the input circuit $L_1$, $C_1$ is negatively damped to a suitable value.

On passing over to transmission the switching-on of the coil $L_8$ brings about such a positive feed-back that the triode systems generate oscillations that are in the same phase relative to earth and which are transmitted by the aerial D. Modulation of these oscillations is, for example, possible by providing a signal key S in series with the resistance $R_2$. As the coils $L_7'$, $L_7''$ are short-circuited no oscillations having the frequency corresponding to the tuning of the push-pull connected resonant circuit can be generated during the transmitting period.

Instead of switching on alternately the feed-back impedances $L_8$, $L_7'$ and $L_7''$ by means of the switches $S_1$, $S_1'$ and $S_1''$ respectively, damping resistances may alternately by included in the push-pull circuit $L_2'$, $L_2''$, $C_2$ and in the single phase input circuit $L_1$, $C_1$. In the last-mentioned case the condenser $C_8$ and the coil $L_8$ may be omitted.

Instead of the mixing systems T', T'' a preceding high-frequency amplification system may be used to generate the oscillations to be transmitted.

In the forms of construction given by way of example the cathodes of the two mixing systems are interconnected, and the push-pull circuit is connected between the control grids. It is however, also possible to interconnect the control grids of the mixing systems and to connect the push-pull circuit between the cathodes.

What I claim is:

1. A mixing system for combining high frequency oscillations with local oscillations to produce an intermediate frequency wave comprising a pair of electron discharge tubes arranged in push-pull relation, each tube including a cathode electrode, a grid electrode and an anode element and having a predetermined internal capacity between said grid and anode, a resonant input circuit connected between one pair of corresponding electrodes of said tubes and tuned to the frequency of the local oscillations, the other pair of corresponding electrodes being interconnected, an output circuit connected between the anode elements of said tubes for deriving the intermediate-frequency wave therefrom, an auxiliary circuit for applying the high frequency oscillations between the electrical center of said input circuit and said interconnection, said auxiliary circuit and said input circuit together constituting a single phase circuit with respect to said high frequency oscillations, a pair of inductances each interposed between one of said anodes and one end of said output circuit, said inductances each having a value at which developed thereacross is a positive feedback voltage which is applied to the input circuit solely through the internal capacty existing between the anode element and the grid electrode to effect a reduction in the damping of said input circuit, and an impedance connected between the electrical center of said output circuit and said interconnection and having a value effecting a change in the damping of said single phase circuit for the high frequency oscillations relative to said input circuit for said local oscillations.

2. An arrangement, as set forth in claim 1, wherein said impedance is constituted by a capacitor producing a negative feedback voltage increasing the damping of said single phase circuit.

3. An arrangement, as set forth in claim 1, wherein said impedance is constituted by an inductance producing a positive feedback voltage decreasing the damping of said single phase circuit.

4. A mixing system for combining high frequency oscillations with local oscillations to produce an intermediate frequency wave comprising a pair of electron discharge tubes arranged in push-pull relation, each tube including a cathode, a grid and an anode and having a predetermined internal capacity between said grid and anode, said cathodes being interconnected, a resonant input circuit connected between the grids of said tubes and tuned to the frequency of local oscillations, a source of local oscillations coupled to said input circuit whereby said local oscillations are fed to said grids in phase opposition, an output resonant circuit connected between the anodes of said tubes and tuned to the frequency of the intermediate-frequency wave, an auxiliary circuit for applying the high frequency oscillations between the electrical center of said input circuits and said interconnection whereby said high frequency oscillations are applied in said grids in phase, means connecting the electrical center of said output circuit to said interconnection, and a pair of inductances each interposed between one of said anodes and one end of said output circuit, said inductances each having a value at which developed thereacross is a positive feedback voltage which is applied to the input circuit solely through the interelectrode capacity existing between said anode and grid to effect a reduction in the damping of said input circuit.

5. A mixing system for combining high frequency oscillations with local oscillations to produce an intermediate frequency wave comprising a pair of electron discharge tubes arranged in push-pull relation, each tube including a cathode, a grid and an anode and having a predetermined internal capacity between said grid and anode, said cathodes being interconnected, a resonant input circuit connected between the grids of said tubes and tuned to the frequency of local oscillations, an output resonant circuit connected between the anodes of said tubes and tuned to the frequency of the intermediate-frequency wave, an auxiliary circuit for applying the high frequency oscillations between the electrical center of said input circuit and said interconnection whereby said high frequency oscillations are applied in said grids in cophasal relation, means connecting the electrical center of said output circuit to said interconnection, and a pair of inductances each interposed between one of said anodes and one end of said output circuit, said inductances each having a value at which developed thereacross is a positive feedback voltage which is applied to the input circuit solely through the interelectrode capacity existing between said anode and grid of said tubes to render the mixing circuit oscillatory at the frequency of said local oscillations.

6. An arrangement, as set forth in claim 5 further including a capacitor interposed between the electrical center of said output circuit and said interconnection to develop a negative feedback voltage increasing the damping of the cophasal circuit.

ADELBERT VAN WEEL.

REFERENCES CITED

The following references are of record in the file of this patent:

UNITED STATES PATENTS

| Number | Name | Date |
|---|---|---|
| 1,557,067 | Kuhn | Oct. 13, 1925 |
| 1,853,179 | Van Roberts | Apr. 12, 1932 |
| 1,876,107 | Usselman | Sept. 6, 1932 |
| 1,968,610 | Mathiew | July 21, 1934 |
| 2,088,432 | Peterson | July 27, 1937 |
| 2,107,395 | Schelesinger | Feb. 8, 1938 |
| 2,205,359 | Jensen | June 18, 1940 |
| 2,288,214 | Summers | June 30, 1942 |
| 2,296,107 | Kimball | Sept. 15, 1942 |
| 2,366,329 | George | Jan. 2, 1945 |